United States Patent [19]

Kuecker

[11] Patent Number: 4,531,307
[45] Date of Patent: Jul. 30, 1985

[54] FABRIC DRYER CONTROL WITH CYCLE INTERRUPT

[75] Inventor: Pamela M. Kuecker, Newton, Iowa

[73] Assignee: The Maytag Company, Newton, Iowa

[21] Appl. No.: 565,732

[22] Filed: Dec. 27, 1983

[51] Int. Cl.³ .............................................. F26B 19/00
[52] U.S. Cl. ......................................... 34/48; 34/53; 34/55
[58] Field of Search ................ 34/48, 53, 55; 374/183

[56] References Cited

U.S. PATENT DOCUMENTS

| | | | |
|---|---|---|---|
| 3,029,642 | 4/1962 | Burhans et al. | 374/183 |
| 4,019,259 | 4/1977 | Veraart | 34/48 |
| 4,031,365 | 6/1977 | Raggiotti et al. | 374/183 |
| 4,195,500 | 4/1980 | Tobita et al. | 68/12 R |
| 4,231,166 | 11/1980 | McMillan | 34/48 |
| 4,275,508 | 6/1981 | Jones | 34/48 |
| 4,371,271 | 2/1983 | Bellet | 374/183 |
| 4,386,471 | 6/1983 | Bowrey et al. | 34/48 |
| 4,393,300 | 7/1983 | Proctor | 219/497 |
| 4,397,101 | 8/1983 | Rickard | 34/48 |

Primary Examiner—Larry I. Schwartz
Assistant Examiner—David W. Westphal
Attorney, Agent, or Firm—Richard L. Ward

[57] ABSTRACT

A fabric drying apparatus including a fabric tumbler is provided which includes control circuitry for interrupting a cycle upon detection of temperature signals outside a predetermined range. A power supply energizes the fabric drying apparatus. A heater is generally associated with the fabric tumbler for providing heated airflow thereto. Temperature sensing circuitry includes at least one thermostat for controlling the cyclic operation of the heater to provide airflow in a predetermined temperature range. The temperature sensing circuitry further includes oscillator circuitry operable to provide a frequency output variable in response to airflow temperature. A control system includes a microcontroller in communication with the oscillator circuitry, the cycle selection switches, the display system and the power supply. The microcontroller is operable for monitoring the temperature of the airflow through the frequency output of the oscillator circuit and for deenergizing the fabric drying apparatus and preventing reenergization thereof responsive to a frequency output outside a predetermined range. The frequency output outside of the predetermined range is indicative of a failure of the cycling thermostat or the thermistor circuitry and the microcontroller will effect the display of a coded message corresponding thereto in the display system.

8 Claims, 5 Drawing Figures

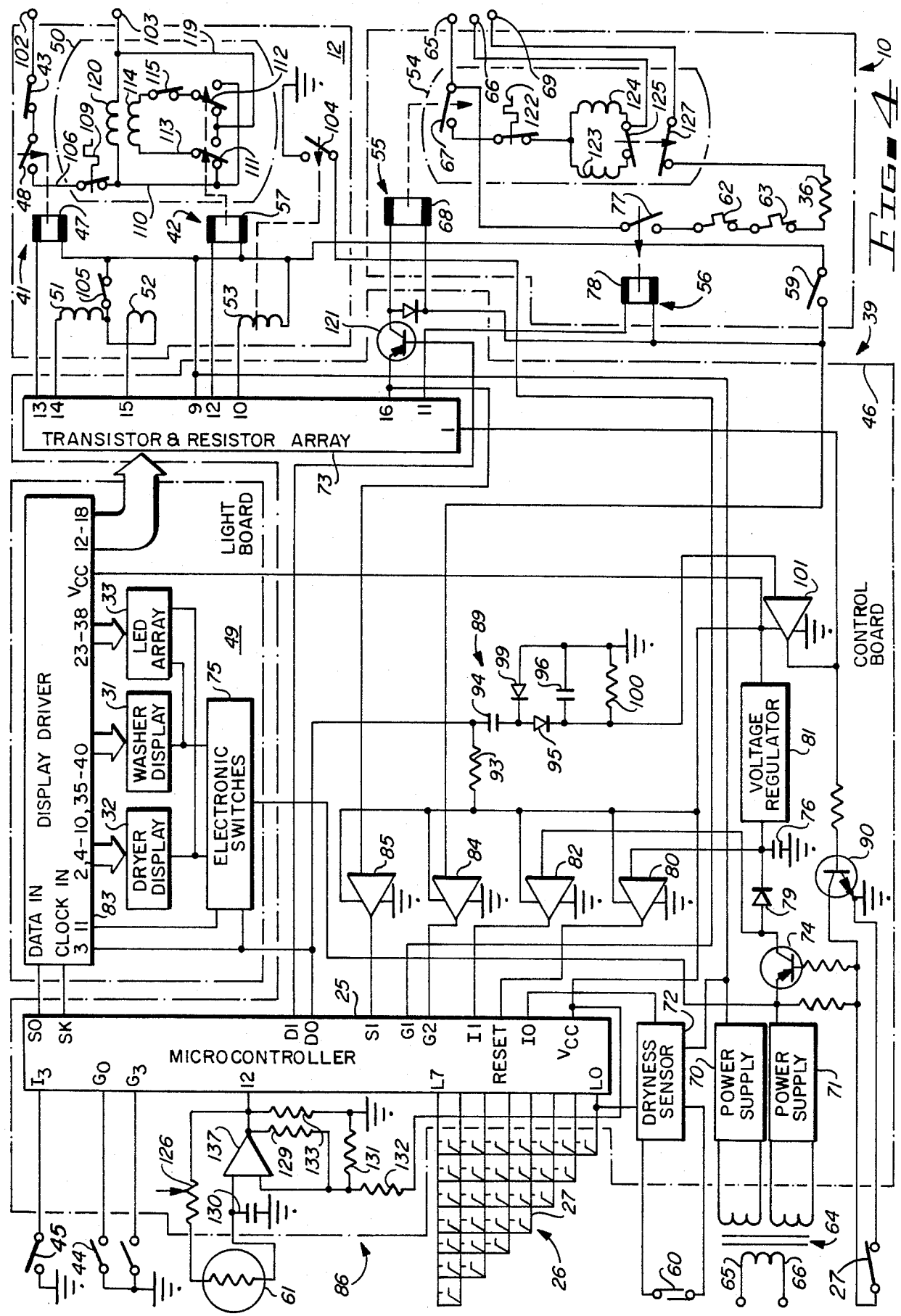

FABRIC DRYER CONTROL WITH CYCLE INTERRUPT

BACKGROUND OF THE INVENTION

This invention relates generally to fabric drying apparatus and more particularly to control circuitry therefor. The control circuitry for the fabric drying apparatus includes the usual cycling and high limit thermostats as well as thermistor based oscillator circuitry for temperature sensing. The frequency of oscillation changes in response to changes in airflow temperature and is monitored by a microcontroller. The detection of oscillation frequencies outside a predetermined range, and therefore temperatures above a predetermined limit, indicate failure of either the cycling thermostat or a thermistor circuit component and will cause the microcontroller to effect deenergization of the fabric drying apparatus.

The prior art includes U.S. Pat. No. 4,195,500 issued on Apr. 1, 1980 to Tobita et al. This patent teaches an automatic washer having a weight sensor associated with the tub for sensing the weight of and therefore the quantity of water in the tub. If a predetermined rate of change of weight is detected in a predetermined time period during a fill the cycle will proceed. During drain, if a predetermined change in weight does not occur in a predetermined time, it is determined that the drain unit is faulty. If the vibration of the drive motor is not sensed through the weight sensor, it is determined that the motor is locked. Each of these determinations is made at predetermined times in a cycle of operations and the control will not allow further operation until the particular problem has been resolved. Three indicator lights will flash in wash, rinse or dehydration modes depending on cycle position if operation is normal. Abnormal operation is indicated by various combinations of ON and flashing indicator lights.

Proctor, U.S. Pat. No. 4,393,300 issued on July 12, 1983, is representative of temperature sensing thermistor circuits as used in microwave ovens for determining the end of the heating process.

The prior art has thus shown the sensing of the rate of change of tub weight in a washing machine for detecting malfunctions in filling, washing and dehydration. The vibrations relating to motor operation are also sensed through the same weight sensor. Thermistor temperature sensing circuitry has also been utilized in microwave oven design for determining the heating cycle end point. There has been, however, no known showing of thermistor based oscillator circuitry for sensing the temperature of airflow through fabric drying apparatus where the thermistor based circuitry provides temperature sensing inputs to a microcontroller and detects an oscillation frequency outside of a predetermined range to indicate failure of certain circuitry components. Detection of frequencies outside of the predetermined range causes the microcontroller to effect deenergization of the fabric drying apparatus and to effect the display of a coded message corresponding to faulty temperature sensing components.

SUMMARY OF THE INVENTION

It is therefore an object of the instant invention to provide an improved temperature sensing control for a fabric drying apparatus.

It is a further object of the instant invention to provide a control system for a fabric drying apparatus having improved temperature sensing circuitry and a controller operable for deenergizing the fabric drying apparatus upon detecting faulty temperature sensing components.

Briefly, the instant invention achieves these objects in a fabric drying apparatus including a fabric tumbler and having control circuitry operable for interrupting apparatus operation upon detection of temperature signals outside a predetermined range. A power supply is provided for energizing the fabric drying apparatus. A control panel includes cycle selection switches and display apparatus. A temperature sensing circuit is generally associated with the fabric tumbler for detecting the temperature of airflow therein and includes an oscillator circuit operable for providing a frequency output variable in response to airflow temperature. Control circuitry includes a microcontroller in communication with the temperature sensing circuitry, the cycle selection switches, the display apparatus, and the power supply. The microcontroller is operable for monitoring the frequency output of the temperature sensing circuitry and for deenergizing the fabric drying apparatus and preventing energization thereof responsive to a frequency output outside a predetermined range.

Operation of the control circuitry and further objects and advantages thereof will become evident as the description proceeds and from an examination of the accompanying three sheets of drawings.

BRIEF DESCRIPTION OF THE DRAWINGS

The drawings illustrate a preferred embodiment of the invention with similar numerals referring to similar parts throughout the several views wherein:

FIG. 4 is an electrical schematic drawing of the control circuitry for the combined appliance of FIG. 1.

DESCRIPTION OF A PREFERRED EMBODIMENT

Figure 1:
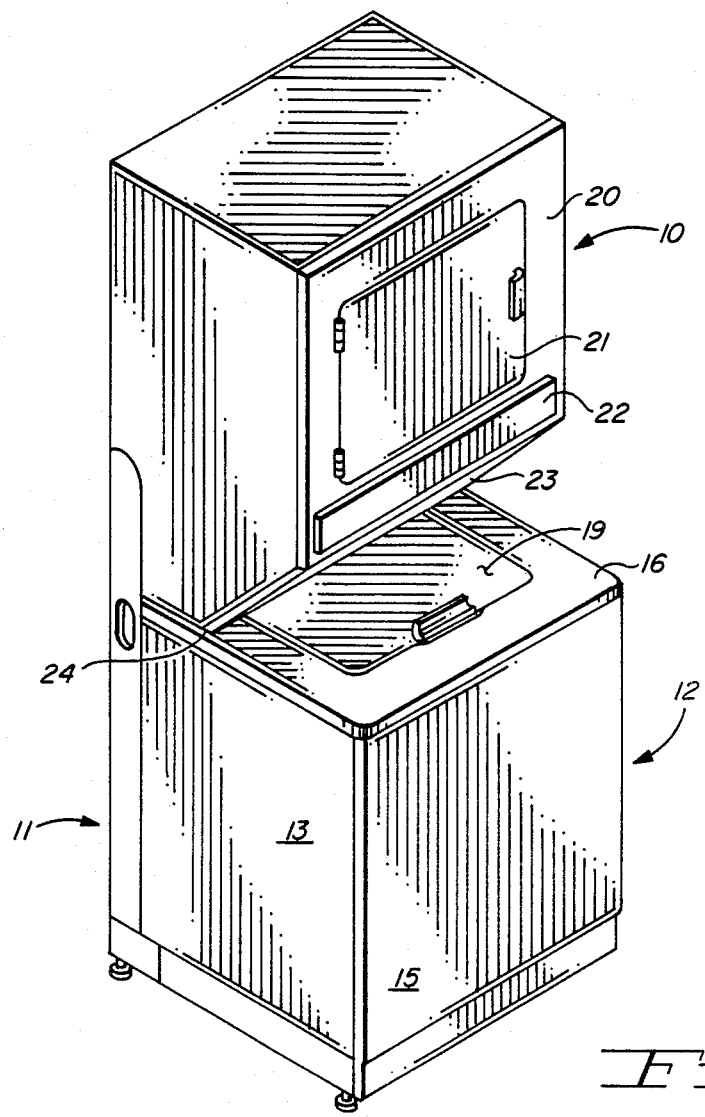
FIG. 1 is an isometric view of a washer/dryer combined appliance mounted in a stack arrangement through a support stand.

Referring now to the drawings, there is best shown in FIG. 1 a pair of laundry appliances with a fabric dryer 10 mounted on an appliance support stand 11 above an automatic washer 12.

Figure 3:
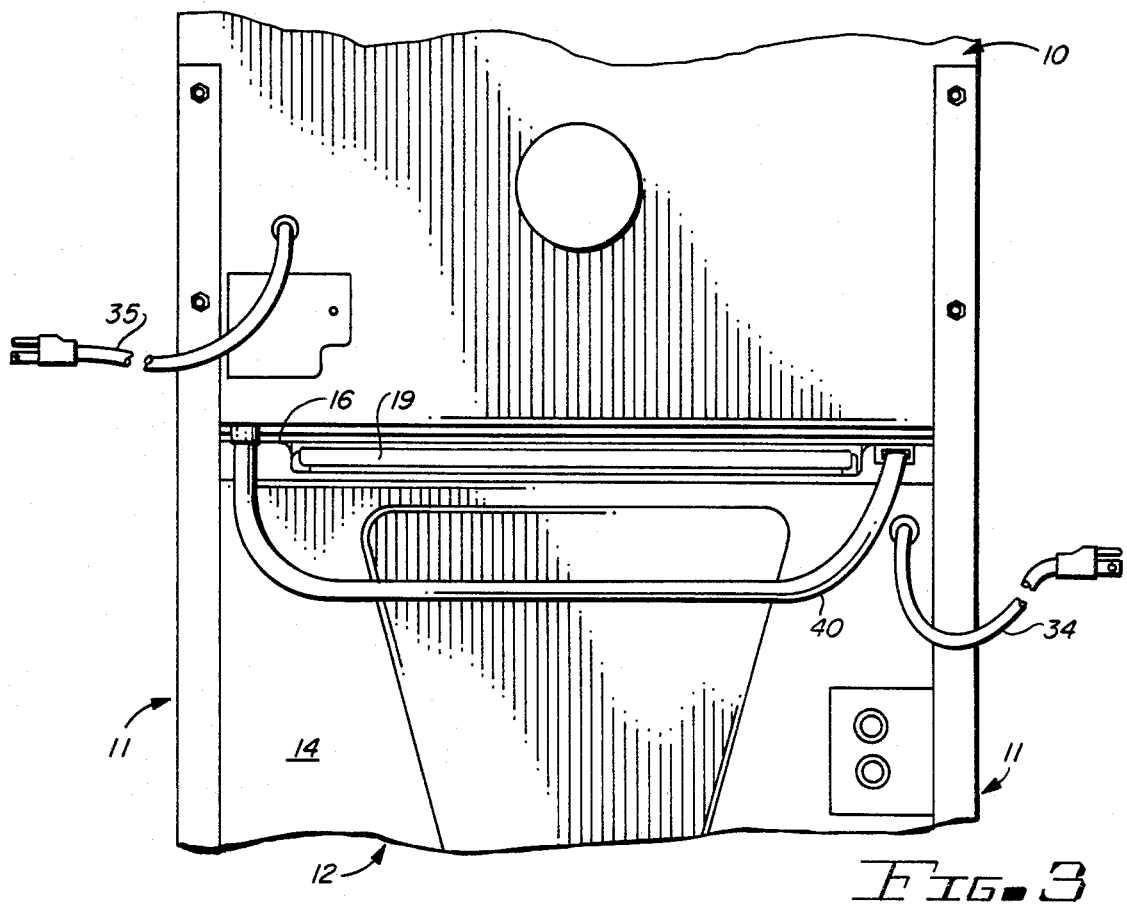
FIG. 3 is a partial rear view of the combined appliance of FIG. 1 showing the individual power connections and interconnecting low voltage cable.

Briefly, in this embodiment of the invention, the automatic washer 12 is housed within a generally rectangular cabinet having a three-sided enclosure member forming the sides 13 and rear wall 14 of the cabinet as best shown in FIGS. 1 and 3. A vertically oriented front panel 15 completes the peripheral cabinet enclosure of the automatic washer 12. The cabinetry of the automatic washer 12 also includes a substantially horizontal top cover 16 having a slidable access door 19 for providing access to the interior of the automatic washer 12.

The fabric dryer 10 is shown mounted in a cantilevered fashion on the support stand 11 directly above the automatic washer 12 and also has a generally rectangular enclosure which is substantially shorter in front-to-rear depth than that of the automatic washer 12. The vertically oriented dryer front panel 20 includes an access door 21 for loading and unloading the fabrics to be dried. Controls, such as control panel 22, may be positioned on the fabric dryer 10 and/or automatic washer 12 through which the automatic washer 12 and fabric dryer 10 are controlled. As further shown in FIG. 1, the lower front panel 23 of the fabric dryer 10 tapers rearwardly from a point adjacent the bottom edge of the front panel 20. The lower edge 24 of the fabric dryer lower front panel 23 is adjacent to but spaced slightly above the top cover 16 of the automatic washer 12.

Figure 2:
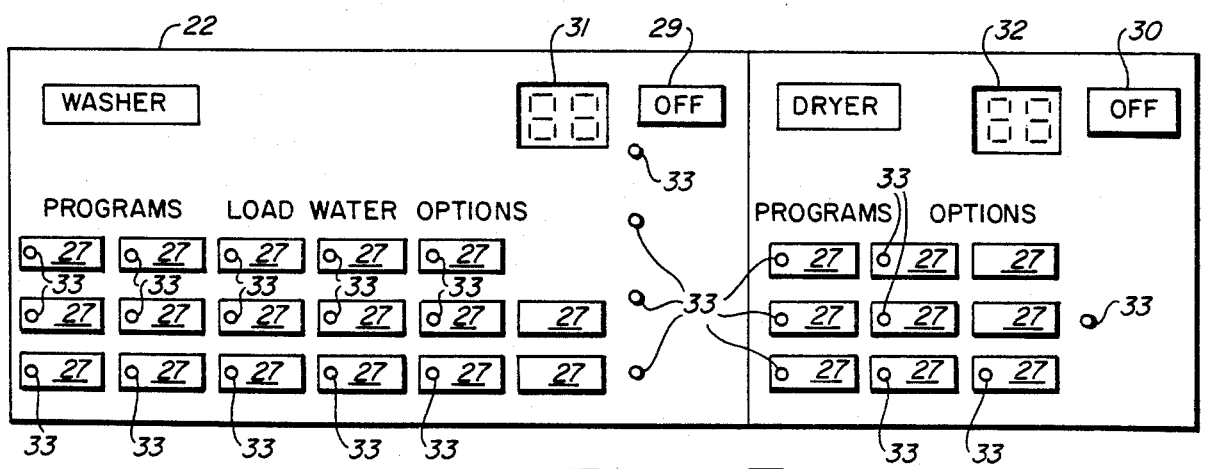
FIG. 2 is a general control panel configuration of the combined appliance of FIG. 1.

FIG. 2 shows the general layout of the control panel 22 which is located just below the access door 21 of the fabric dryer 10 of the combined laundry appliance shown in FIG. 1. In this embodiment, the control panel 22 is divided into separate control sections for the automatic washer 12 and for the fabric dryer 10. As will be discussed further herein, the automatic washer 12 and the fabric dryer 10 may be operated individually or concurrently through a single microcontroller 25 as depicted in the schematic circuit of FIG. 4. The control panel 22 of FIG. 2 includes a membrane switch keyboard 26 with a plurality of selection pads or switches 27 associated with the automatic washer 12 and the fabric dryer 10 for selecting desired programs and program options and communicating the selections to the microcontroller 25 of FIG. 4. Both the automatic washer 12 and the fabric dryer 10 include off pads 29 and 30, displays 31 and 32 for indicating cycle time and a plurality of LEDs 33 associated with the various selection pads to indicate the selected program and options.

The rear of the combined appliance of FIG. 1, which is shown in FIG. 3, best indicates that the automatic washer 12 and the fabric dryer 10 are individually powered by line current through separate power cords 34 and 35. The particular embodiment of the combined appliance shown in the schematic circuit of FIG. 4 has 120 VAC supplied to the automatic washer 12 and 240 VAC to the fabric dryer 10 since this embodiment utilizes an electric heater 36. As previously indicated, the control panel 22 is secured to one appliance such as the fabric dryer 10 and the control circuitry 39 of FIG. 4 derives its power from the line current for the fabric dryer 10. As further shown in FIG. 3, a low voltage interconnecting cable 40 extends between the cabinet bottom of the fabric dryer 10 and the rear of the top cover 16 of the automatic washer 12 for carrying low voltage signals from the control circuitry 39 to various components within the automatic washer 12 such as control relays 41 and 42, door switch 43, pressure switch 44 and the unbalance switch 45.

Turning now to FIG. 4, there is shown an electrical circuit 39 for the combined appliance of a fabric dryer 10 and automatic washer 12 as depicted in FIGS. 1–3. The electrical circuit 39 of FIG. 4 includes a pair of circuit boards 46 and 49 with the circuitry of the boards 46 and 49 generally outlined in dashed lines and with the boards 46 and 49 labeled "control board" and "light board". Various components associated with these circuit boards, but not physically mounted thereon, such as the automatic washer drive motor 50 and its relays 41 and 42, hot and cold water valves 51 and 52, door switch solenoid 53, pressure switch 44, unbalance switch 45, fabric dryer drive motor 54 and its relay 55, fabric dryer heater 36 and its relay 56, fabric dryer door switch 59, fabric dryness sensors 60, temperature sensors including a thermistor 61 and 155° cycling and high limit thermostats 62 and 63, keyboard 26 and transformer 64 are shown outside the dashed line perimeter of the circuit boards 46 and 49.

The transformer 64, located away from but connected to the control board 46, is powered by 120 VAC across conductors 65 and 66 supplying power to the fabric dryer 10. The transformer 64 supplies 26.4 VAC and 10 VAC to a pair of bridge rectifiers not shown but associated with power supplies 70 and 71 respectively.

The 26.4 VAC exits power supply 70 at 25 VDC to the dryness sensor 72, the automatic washer relays 41 and 42, the fabric dryer relays 55 and 56 through the dryer door switch 59, the automatic washer water valves 51 and 52 and to the transistor and resistor array 73 through pin or terminal 9.

The 10 VAC exits power supply 71 at 8.6 VDC to switching transistor 74 and to the rectangle 75 labeled "electronic switches" located on the light board 49 where the 8.6 VDC is switched and regulated according to outputs 3 and 11 of the display driver 83 to selectively power the LED array 33 and displays 31 and 32. The switching transistor 74 is turned on when one of the nine program switches 27 for the automatic washer 12 or fabric dryer 10 shown in FIG. 2 are closed. Filter capacitor 76 is then charged to approximately 11 VDC through the blocking diode 79. This 11 VDC is available to the low voltage detector circuit 80 and to the voltage regulator 81. The low voltage detector circuit 80 will provide a reset of the microcontroller 25, represented by the rectangle labeled "microcontroller" on the left side of the schematic, if the voltage input at the voltage regulator 81 is less than about 7 VDC. The voltage regulator 81 when supplied with an input voltage of greater than or equal to 7 VDC, provides 5 VDC (VCC) to operate the control circuitry 39. The 8.6 VDC is also used to provide a 120 Hz. square wave pulse through the pulse generator circuit 82 to a real time clock for timing and control of the combined appliance.

The microcontroller 25 shown in FIG. 4 is, in the preferred embodiment of the invention, a National Semiconductor COP440 single chip N-channel microcontroller. The microcontroller 25 is adapted for serially outputting data on output "SO" to a "data in" input on a National Semiconductor MM5450N display driver 83 which is represented by a rectangle 83 labeled "display driver" in FIG. 4. The microcontroller 25 also provides a synchronizing pulse at output "SK" to shift data on the "SO" output into the "data in" input of the display driver 83.

The display driver 83 is operable for driving the pair of two digit displays 31 and 32 and the LED array 33 associated with the automatic washer 12 and the fabric dryer 10 through outputs 2, 4–10, 35–40 and 23–38. The display driver 83 also outputs data on outputs "12–18" to a Sprague ULN-28X1A transistor array 73 for driving the various relays and solenoids associated with the automatic washer 12 and fabric dryer 10.

Returning to the power supply circuitry, the five VDC output of the voltage regulator 81 provides low voltage operating current for the microcontroller 25, the display driver 83, the amplifier circuits 80, 82, 84, 85, 101 and for the temperature sensing circuit 86 of the fabric dryer 10.

The fabric dryness sensor 72 is electrically connected to a pair of sensor bars or electrodes 60 located within the fabric tumbling chamber of the fabric dryer 10. The conductivity of the clothes load in the fabric dryer 10 is used as an input to a software programmable amplifier located within the rectangle 72 labeled "dryness sensor" in FIG. 4. By controlling the state of port "LO" of the microcontroller 25, the gain is controlled to differentiate between wet fabrics and metal. The output of a transistor switch is read by input "I0" of the microcontroller 25 and variation of the final dryness is achieved by a software algorithm.

Input ports "L0-L7" of the microcontroller 25 are connected to the folded matrix of the control panel membrane switch keyboard 26. These eight input ports produce 28 keyboard switches 27 which are decoded through the software for the combined appliance. One of the program switches 27 is isolated in the lower left corner of the electrical schematic circuit 39 to illustrate the method of latching the control system in an "on" posture once a program switch 27 has been selected. Once the microcontroller 25 is operating and the display driver 83 is functioning, the missing pulse detector circuitry 89, which will be described herein, will latch transistor 90 and will maintain transistor 90 in an operational posture after the program switch 27 is opened.

Figure 5:
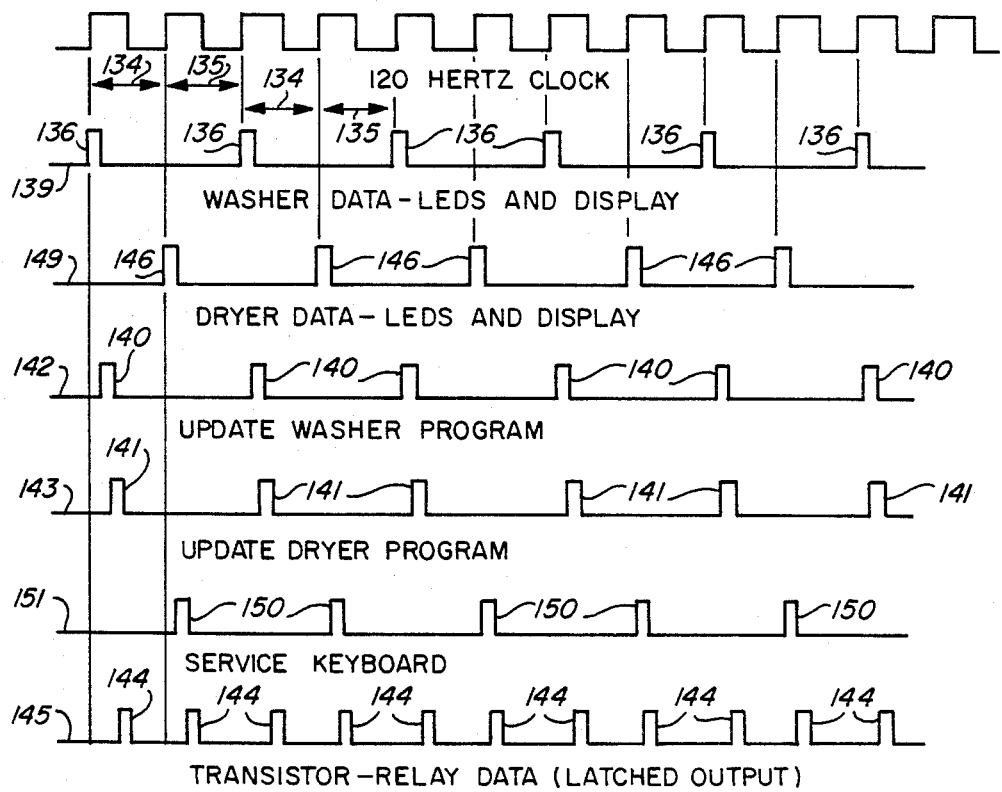
FIG. 5 is a timing chart corresponding to the control circuitry of FIG. 4 shown out of order with FIG. 3.

The display driver 83 is operable for alternately outputting data pulse signals at outputs "3" and "11" every other pulse 134 and 135 of the 120 Hz. clock. Every 8.3 milliseconds a pulse will be output on either output "3" or output "11" of the display driver 83. These pulses are referred to as timing pulses or data signals and are illustrated in FIG. 5 which will be further discussed herein. Every other pulse or data signal updates circuitry associated with either the automatic washer display 31 and LEDs 33 or the fabric dryer display 32 and LEDs 33 through electronic switching circuitry located within the rectangle 75 labeled "electronic switches" on the light board 49 so that they are alternately energized in a multiplexing manner.

Referring now to FIG. 5, there is shown a timing chart for the data signals which are output by the display driver 83 at outputs "3" and "11"; outputs "2, 4-10, 23-37, 35-40" to the displays 31 and 32 and LED array 33; and at outputs "12-18" to the transistor and resistor array 73. The display driver 83 outputs data signals every 8.3 milliseconds or each cycle of a 120 Hz. clock. FIG. 5 best shows how the timing is arranged to enable the microcontroller 25 to control the individual or concurrent operation of at least a pair of appliances, which are in this embodiment, an automatic washer 12 and a fabric dryer 10.

In FIG. 5, during the first 8.3 milliseconds clock pulse output 134 on output 3 of the display driver 83, the microcontroller 25 updates the LEDs 33 and display 31 for the automatic washer 12 through the appropriate outputs of the display driver 83 as generally indicated by the pulse trace 136 on line 139 which takes about 0.1 millisecond. During this clock pulse 134, the microcontroller 25 goes through the program routines for the automatic washer 12 and fabric dryer 10 which takes only a fraction of the 8.3 milliseconds clock pulse 134 as generally indicated by the pulse traces 140 and 141 on lines 142 and 143. Also, during this clock pulse 134, the microcontroller 25 will output data to the appropriate relays and solenoids on outputs 12-18 of the display driver 83 to the transistor and resistor array 73. The output to the transistor and resistor array 73 is depicted by the pulse trace 144 on line 145 of FIG. 9. The next clock pulse 135, 8.3 milliseconds later than clock pulse 134 and output on output 11 of the display driver 83, updates the LEDs 33 and display 32 of the fabric dryer 10. This updating is indicated by the pulse trace 146 at line 149 in FIG. 9. During this clock pulse 135, the keyboard 26 is serviced as indicated by pulse trace 150 on line 151 of FIG. 9 and the relays and solenoids are updated as shown by pulse trace 144 on line 145. Thus, the microcontroller 25 will, by alternately outputting data to one appliance 10 or 12 and then the other appliance 10 or 12, control the operation of at least a pair of appliances. The LEDs 33 and displays 31 and 32 for the automatic washer 12 and the fabric dryer 10 are updated every other clock pulse 134 or 135 on an alternating basis and similarly the automatic washer 12 and fabric dryer 10 programs and keyboard service are updated. Only the outputs to the transistor and resistor array 73 are updated every clock pulse 134 and 135 to latch the operation of components which are driven through the transistor and resistor array 73.

The missing pulse detector circuitry 89 ensures that the state of the combined appliance is always under control of the microcontroller 25. The voltage at the junction of resistor 93 and capacitor 94 is continually restored to 5 volts through resistor 93 after being pulled to a zero voltage condition by the display driver 83. Capacitor 94 allows the positive component of the 5 volt square wave produced at the junction of resistor 93 and capacitor 94 to flow through the diode 95 and charge capacitor 96. Capacitor 94 is also charged through diode 99 on the positive component of the 5 volt square wave. Capacitor 94 will be discharged through diode 99 on the negative component of the 5 volt square wave. Resistor 100 allows capacitor 96 to discharge over a period of time. Amplifier 101 will sense the charge on capacitor 96 which indicates that the 5 volt square wave is being generated at output "3". If this waveform is not present at output "3" of the display driver 83 it will be sensed through the amplifier 101 to effect the turn-off of the latching transistor 90 and the transistor and resistor array 73. The missing pulse detector circuitry 89 thus protects against continuous appliance operation if the microcontroller 25 on display driver 83 should malfunction.

Input "I3" of the microcontroller 25 receives an input signal from a single pole-single throw switch 45 located within the automatic washer 12 adjacent the outer wash tub (not shown). When a large oscillation of the wash tub occurs, the switch 45 will be closed to ground and the microcontroller 25 will effect the turn off of the automatic washer relays 41 and 42.

Ports "G0" and "G3" of the microcontroller 25 receive data from a digital water level switch 44. This data is utilized to provide four different water levels to the automatic washer 12.

In the schematic circuit 39 of FIG. 4, 120 VAC electrical power is supplied to the automatic washer 12 between conductors 102 and 103. The automatic washer 12 and the microcontroller 25 are initially powered by pressing a program selection pad or switch 27 associated with the control panel 22 mounted on the fabric dryer 10 as illustrated in FIGS. 1 and 2. Prior to pressing a program selection pad or switch 27, the access door 19 of the automatic washer 12 must be manually closed.

As a cycle of operations is initiated by the microcontroller 25, the access door lock switch 104 is addressed or interrogated to ensure that the switch contacts are open as they should be prior to actuating the solenoid 53 to close the contacts of the access door lock switch 104 and latch the access door 19.

When the condition of the access door lock switch 104 has been checked by the microcontroller 25 to verify that the access door 19 is closed and locked, the microcontroller 25 will initiate energization of the run relay 41 and/or spin relay 42 of the drive motor 50 depending on the cycle selected. If, for example, a cycle requiring agitation is selected, the microcontroller 25 will first energize a tub fill circuit which includes the hot and cold water valves 51 and 52, the overflow switch 105, and the water level sensor 44 which will fill the tub of the automatic washer 12 to the proper level for washing clothes. Once the fill operation has been completed, the coil 47 of the run relay 41 will be energized through the microcontroller 25 and output 13 of the transistor and resistor array 73 to complete a circuit from conductor 102, through the access door switch 43, through relay switch contacts 48 of the run relay 41, through conductor 106, thermal protector 109, conductor 110, first spin relay switch 111, conductor 113, start winding 114, centrifugal switch 115, second spin relay switch 112, and conductor 119 to conductor 103. A parallel circuit is also completed through run winding 120 to conductor 103. Once the drive motor 50 reaches run speed, the centrifugal switch 115 will open and the start winding 114 will drop out of the circuit allowing only the run winding 120 to be energized between conductors 102 and 103.

If a cycle selection calls for spin or rotation of the drive motor 50 in the reverse direction, the microcontroller 25 will first energize the coil 57 of the spin relay 42 to move the first and second spin relay switches 111 and 112 to a second posture. The run relay 41 will then be energized to complete the run circuit for the drive motor 50 but in an opposite direction of rotation from agitate since the start winding 114 will be energized in the reverse direction.

Port "G2" of the microcontroller 25 senses, through amplifier 84, the state of the fabric dryer door switch 59 which is a single pole-single throw switch for interrupting the 25 VDC power to the dryer motor relay 55 and heater relay 56. When the fabric dryer door switch 59 is sensed open by the microcontroller 25, a dryer motor relay transistor within the transistor and resistor array 73 and transistor 121 are separately turned off by the microcontroller 25. The relay transistor for the fabric dryer motor 54 is serially connected to the emitter of transistor 121 at output 16 of the transistor and resistor array 73. Both of these transistors must be capable of being toggled before operation of the fabric dryer 10 is permitted. The state of the relay transistor for the fabric dryer motor 54 and the dryer motor control transistor 121 are sensed at input "S1" through amplifier 85.

The fabric dryer drive motor 54 in this embodiment of the invention is energized by 120 VAC between power conductors 65 and 66 and the heater 36 for the fabric dryer 10 is energized by 240 VAC between power conductors 65 and 69. Once the switch 67 for the motor relay 55 has been closed by energization of the coil 68 through transistor 121, a circuit is completed from conductor 65 through the relay switch 67, through the thermal protector 122, through the start and run windings 123 and 124 and through the centrifugal switch 125 to conductor 66. When the drive motor 54 has achieved run speed, the pair of internal centrifugal switches 125 and 127 will each be operated allowing the motor run winding 124 to operate alone and allowing the heater 36 to be energized between conductors 65 and 69 if the switch 77 of the heater relay 56 has been closed by energization of the relay coil 78 through output 11 of the transistor and resistor array 73.

If both the automatic washer 12 and the fabric dryer 10 are operating and one of the two appliances 10 or 12 completes its cycle of operations, the combined appliance program will check a subroutine flag set when the other appliance 10 or 12 started its cycle of operations and if the subroutine flag is still set the microcontroller 25 will not be powered down. When this subroutine flag is cleared, indicating that both appliance 10 and 12 have completed their cycles, the microcontroller 25 will be allowed to power down.

Also shown in FIG. 4 is a thermistor 61 which is physically located in the fabric dryer 10 for sensing the temperature of the airflow through the fabric dryer 10. The thermistor 61 provides a continuous backup sensing system for the 155° cycling thermostat 62 and a continuous temperature sensing input to the microcontroller 25. The thermistor 61 and variable resistor 126 form a feedback component to provide the negative oscillation for an oscillator circuit with resistor 126 being operable for adjusting the frequency of the circuit especially during manufacture to compensate for tolerances and various timing delays. Resistor 129 is a feedback component for providing the positive oscillation for the oscillator circuit. Capacitor 130 and the resistance of the thermistor 61 determine the frequency of oscillation. Resistors 131 and 132 provide a reference voltage from which the circuit can oscillate and resistor 133 pulls down the output voltage of the amplifier.

The microcontroller 25 monitors the frequency of the oscillator circuit which varies as the resistance of the thermistor 61 varies with changes in temperature. The microcontroller 25, through thermistor 61, limits operation of the fabric dryer 10 to temperatures between approximately −32° F. and 175° F. If the oscillation frequency is higher than the frequency corresponding to the upper temperature limit, it is an indication that the fabric dryer 10 is operating at too high a temperature and that the thermistor 61 or the 155° F. cycling thermostat 62 have failed.

When the fabric dryer 10 is in a low temperature drying program where the upper limit of the airflow temperature is to be in the general vicinity of 140° F., the thermistor temperature sensing circuitry 86 is used as a means for regulating the airflow temperature. The airflow temperature is regulated by the microcontroller 25 controlling operation of the heater relay 56. The thermistor circuitry 86 in combination with the microcontroller 25 thus take the place of a 140° F. cycling thermostat for this low temperature drying program. If the heater relay 56 should fail in a contact closed posture when in this mode of operation, the 155° cycling thermostat 62 will control the circuit as a back-up device.

If, for some reason, the frequency of oscillation is below a predetermined value, such as could exist if the temperature of the air surrounding the thermistor 61 is less than −32° F. or if one of the connections is off the thermistor 61, the microcontroller 25 will terminate operation of the fabric dryer 10 and cause a "6E" to be displayed in the fabric dryer display 32.

Generally, there are two conditions which will cause the fabric dryer 10 to operate at a too hot temperature, either the calibration of the thermistor 61 is off or the cycling thermostat 62 is bad. Both of these conditions will cause the oscillator circuit to operate at an elevated frequency. The microcontroller 25 will detect this elevated frequency and will terminate operation of the cycle and cause a "7E" code to be displayed in the display 32 of fabric dryer 10. The fabric dryer 10 will remain inoperable until corrective action such as replacing the thermistor 61 or thermostat 62 has been taken by a service person.

There has thus been shown and described herein a control system for a fabric drying apparatus which includes temperature sensing circuitry for providing a temperature sensing input to a microcontroller. The temperature sensing circuitry includes a thermistor in the airstream of the fabric drying apparatus and associated oscillator circuitry for oscillating at a frequency dependent on the temperature of the airstream. Detection of a frequency outside of a predetermined range and therefore failure of the cycling thermostat or thermistor circuitry will cause the microcontroller to deenergize the fabric drying apparatus and prevent energization until corrective action has been taken.

In the drawings and specification, there has been set forth a preferred embodiment of the invention and although specific terms are employed these are used in a generic and descriptive sense only and not for purposes of limitation. Changes in the form and proportion of parts as well as the substitution of equivalents are contemplated as circumstances may suggest or render expedient without departing from the spirit or scope of the invention as further defined in the following claims.

I claim:

1. Fabric drying apparatus including a fabric tumbler and control circuitry operable for interrupting operation responsive to sensing temperatures outside a predetermined range, comprising: power supply means for energizing said fabric drying apparatus; heater means in airflow communication with said fabric tumbler for providing heated airflow to said fabric drying apparatus; cycle termination means for terminating operation of said fabric drying apparatus at completion of a selected cycle; temperature sensing means independent of said cycle termination means and generally associated with said fabric tumbler for detecting the temperature of airflow within said fabric tumbler, said temperature sensing means including thermostat means, thermistor means and oscillator circuit means operable for providing a frequency output representative of temperature signals variable in response to variations in airflow temperature; and control means including microcontroller means in communication with said temperature sensing means and power supply means, said microcontroller means being operable in a first circuit mode including said thermostat means, thermistor means and oscillator circuit means for limiting said fabric drying apparatus to operation within first predetermined temperature limits by monitoring the frequency output of said temperature sensing means for deenergizing said fabric drying apparatus and preventing reenergization thereof responsive to said temperature signals outside said first predetermined temperature limits, said microcontroller means being further operable in a second circuit mode including said thermistor means and oscillator circuit means for continuously monitoring the frequency output of said temperature sensing means for deenergizing said heater means responsive to said temperature signals outside a second predetermined temperature limit and operable for reenergizing said heater means responsive to said temperature signals within said second predetermined temperature limit.

2. Fabric drying apparatus as defined in claim 1 and further including heater relay means controlled by said microcontroller means wherein said temperature sensing means in cooperation with said microcontroller means provides on-off cycling operation of said heater means through said heater relay means to maintain a substantially constant temperature in said fabric drying apparatus.

3. Fabric drying apparatus including a fabric tumbler and control circuitry operable for cycle interruption upon detection of temperature signals outside a predetermined range, comprising: power supply means for energizing said fabric drying apparatus; control panel means including cycle selection means and display means; cycle termination means for terminating operation of said fabric drying apparatus at completion of a selected cycle; temperature sensing means independent from said cycle termination means and generally associated with said fabric tumbler for detecting the temperature of airflow within said fabric tumbler and including thermostat means, thermistor means and oscillator circuit means operable for providing a frequency output representative of temperature signals variable in response to variations in airflow temperature; and control means including microcontroller means in communication with said cycle termination means, temperature sensing means, cycle selection means, display means and power supply means, said microcontroller means cooperable with said cycle termination means for determining the state of cycle completion and being operable for limiting said fabric drying apparatus during said cycle to operation within predetermined temperature limits by continuously monitoring the frequency output of said temperature sensing means and for deenergizing said fabric drying apparatus responsive to said temperature signals outside said predetermined limits, said microcontroller further operable for effecting a display of a coded malfunction message in said display means and for preventing reenergization of said fabric drying apparatus responsive to said deenergization.

4. Fabric drying apparatus as defined in claim 3 wherein said thermistor means is in circuit with said oscillator circuit means for effecting oscillation thereof at frequencies which vary as the resistance of said thermistor means varies with changes in airflow temperature.

5. Fabric drying apparatus as defined in claim 4 wherein said fabric drying apparatus includes heating means and said thermostat means is operable for cycling said heating means to regulate the airflow temperature and wherein said temperature sensing means is continuously operable for detecting failure of said thermostat means by sensing airflow temperature.

6. Fabric drying apparatus as defined in claim 5 wherein said temperature sensing means serves as a back-up temperature limiting device for said thermostat means.

7. Fabric drying apparatus as defined in claim 6 wherein the displayed coded malfunction message indicates to a service person that either the thermistor means or thermostat means is faulty as an indication of the proper corrective action to be taken.

8. Fabric drying apparatus including a fabric tumbler and control circuitry operable for cycle interruption upon detection of temperature signals outside a predetermined range, comprising: power supply means for energizing said fabric drying apparatus; heater means in airflow communication with said fabric tumbler for providing heated airflow to said fabric drying apparatus; control panel means including cycle selection means and display means; cycle termination means for terminating operation of said fabric drying apparatus at completion of a selected cycle; temperature sensing means independent from said cycle termination means and generally associated with said fabric tumbler and including cycling thermostat means for controlling operation of said heater means within predetermined temperature limits, said temperature sensing means further including thermistor means for continuously detecting the temperature of airflow within said fabric tumbler and oscillator circuit means associated with said thermistor means and operable to provide a frequency output representative of temperature signals variable in response to variations in airflow temperature, said combination of thermistor means and oscillator circuit means effectively providing a backup for said cycling thermostat means during a selectable fabric drying cycle; and control means including microcontroller means in communication with said cycle termination means, temperature sensing means, cycle selection means, display means and power supply means, said microcontroller means cooperable with said cycle termination means for determining the state of cycle completion and further being operable for limiting said fabric drying apparatus during said cycle to operation within said predetermined temperature limits by continuously monitoring the frequency output of said oscillator circuit means for deenergizing said fabric drying apparatus responsive to a frequency output outside said predetermined temperature limits, said microcontroller further operable for effecting a display of a coded malfunction message in said display means and for preventing reenergization of said fabric drying apparatus responsive to said deenergization.

* * * * *